United States Patent [19]

Usui et al.

[11] Patent Number: 4,944,537
[45] Date of Patent: Jul. 31, 1990

[54] SMALL-DIAMETER PIPE CONNECTOR

[75] Inventors: Masayoshi Usui, Namazu City; Katsushi Washizu, Shimizu, both of Japan

[73] Assignee: Usui Kokusai Sangyo Kaisha Ltd., Shizuoka Prefecture, Japan

[21] Appl. No.: 362,565

[22] Filed: Jun. 7, 1989

[30] Foreign Application Priority Data

Jun. 13, 1988 [JP] Japan .................................. 63-78170
Sep. 7, 1988 [JP] Japan ................................ 63-117436

[51] Int. Cl.$^5$ .............................................. F16L 39/00
[52] U.S. Cl. ..................................... 285/319; 285/921
[58] Field of Search ................................. 285/319, 921

[56] References Cited

U.S. PATENT DOCUMENTS

| 4,219,222 | 8/1980 | Brusadin | 285/319 X |
| 4,601,497 | 7/1986 | Bartholomew | 285/921 X |
| 4,673,199 | 6/1987 | Renfrew | 285/319 X |
| 4,730,856 | 3/1988 | Washizu | 285/319 |
| 4,753,458 | 6/1988 | Case et al. | 285/319 X |
| 4,776,616 | 10/1988 | Umehara et al. | 285/156 |
| 4,781,400 | 11/1988 | Cunningham | 285/319 X |

Primary Examiner—Dave W. Arola
Assistant Examiner—Carol I. Bordas
Attorney, Agent, or Firm—Anthony J. Casella; Gerald E. Hespos

[57] ABSTRACT

A small-diameter pipe connector comprises a connector body and a socket body. The connector body has a channel, a stepped small-diameter chamber, and a stepped large-diameter chamber formed axially therein-side, whose rear peripheral wall portion defines a support wall. The socket body has obliquely-projecting pawl walls which are adapted to fit into axially-elongate holes formed in the peripheral wall around the large-diameter chamber of the connector body. In the assembled state, an expanded annular wall portion of a pipe is resiliently locked by the distal ends of the pawl walls in the large-diameter chamber, with the rear end inner peripheral surface of the socket body being supported by the outer peripheral surface of the support wall of the connector body.

11 Claims, 2 Drawing Sheets

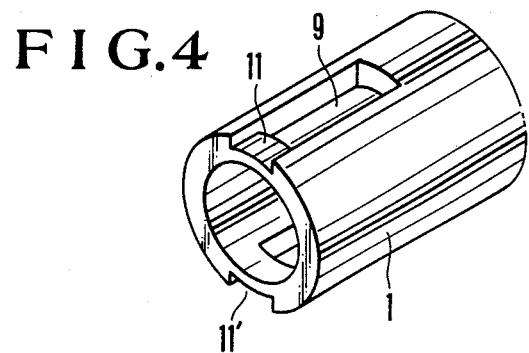
FIG.4
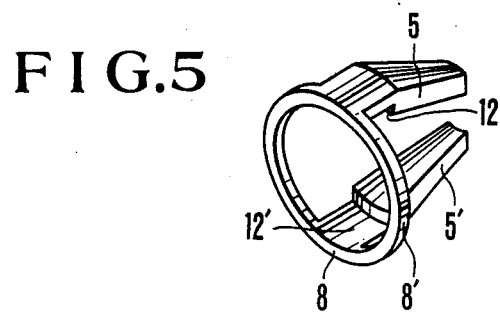
FIG.5
FIG.6
PRIOR ART
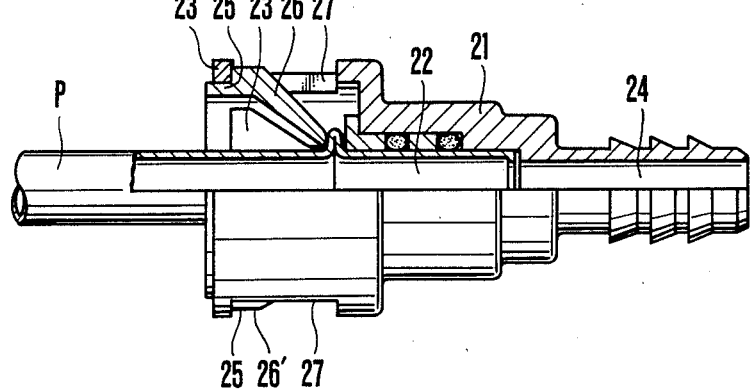

SMALL-DIAMETER PIPE CONNECTOR

BACKGROUND OF THE INVENTION

1. Field of the Invention

This invention relates to an improvement of the configuration of a connector for use with a metallic pipe or resinous tube (hereinafter simply referred to as a pipe) of comparatively small diameter, not exceeding 20 m/m, which generally is installed in cars, machines, apparatus and the like and used as a supply line of oil, air, etc.

2. Description of the Prior Art

A conventional connector of the foregoing type, as shown in FIG. 6, comprises a connector body 21 which has a channel 24, a stepped small-diameter chamber 22, and a stepped large-diameter chamber 23 formed axially thereinside and communicated with each other, and a socket body 25 which has obliquely-projecting pawl walls 26 and 26'. A rear peripheral wall portion of the connector body 21 defines a support wall 23' on which a rear end peripheral wall portion 25' of the socket body 25 is seated from inside, with the pawl walls 26 and 26' being fitted into elongate engage holes 27 and 27' formed in the peripheral wall around the large-diameter chamber 23 of the connector body 21. In the assembled state, the pawl walls 26 and 26' resiliently lock an expanded wall portion of a pipe P in the large-diameter chamber 23.

In the foregoing conventional connector, the pawl walls 26 and 26' are made of resilient material, so that they can snap or deform in the radial direction to a certain extent between the position where the pipe P is not assembled (where the pawl walls extend obliquely upward/downward freely) and the position where they engage with the outer periphery of the pipe P to deform a little (as shown in FIG. 6). According to the prior art, however, the rear peripheral wall portion 25' of the socket body 25 is seated on the inner peripheral surface of the support wall 23' of the connector body 21; therefore, the support wall 23' must be enlarged radially outward at least by a size corresponding to the thickness of the socket body 25 in consideration of the amount of snapping. Further, because of the foregoing configuration, when assembling the socket body 25 to the support wall 23', the pawl walls 26 and 26' of the socket body 25 must be radially compressed so as to pass through inside the support wall 23' from rear; thus, the conventional connector must be made large in diameter as a whole. Therefore, when the connector is to be used and assembled in a narrow space, it sometimes interferes with other parts to become out of order. Further, the pawl walls 26 and 26' of the socket body 25 are made long as the diameter of the connector increases; as a result, their strength of resilient locking exerted at the expanded wall portion of the pipe P becomes weak, and because of above cause plus fatigue, it is impossible to maintain a reliable connected condition over a long period of time.

SUMMARY OF THE INVENTION

The present invention has been devised in view of the foregoing problems in the prior art, thus its object is to provide a small-diameter pipe connector which is configured so that a socket body can be made small in radial size, the overall size of the connector can be made radially compact, the connector can be used and assembled in a narrow space without interference and malfunction, the socket body can be assembled from either front or rear side with easy assembling work, pawl walls can be made comparatively short because of the use of the small-diameter socket body, a sufficient strength of resilient locking can be exerted on an expanded wall portion of a pipe, and a reliable connected condition can be maintained over a long period of time.

To achieve the foregoing object, the present invention provides a small-diameter pipe connector which comprises a connector body having a channel, a small-diameter chamber with a seal ring member and a bush accommodated therein, and a large-diameter chamber whose rear peripheral wall portion defines a support wall, all being formed axially thereinside in that order and communicated with each other; and a socket body having obliquely-projecting pawl walls formed oppositely thereon and adapted to fit into axially-elongate holes formed in the peripheral wall of the large-diameter chamber, whose inner peripheral surface on the rear end side is adapted to engage with the outer peripheral surface of the support wall, thereby defining support means; wherein the distal ends of the pawl walls resiliently lock an expanded annular wall portion in the vicinity of the end of a pipe that is inserted in the large-diameter chamber.

Especially, the support means is defined by a collar wall projecting outward from the rear peripheral wall portion of the support wall and a rear end wall of the portion of the support wall and a rear end wall of the socket body. Or, the support means may be defined by grooves formed oppositely in the support wall and stepped notches formed in root portions of the pawl walls of the socket body which are adapted to engage with the grooves. The rear peripheral wall of the socket body is substantially identical in outer diameter with the connector body. The pipe is made of a metallic pipe or resinous tube.

According to the foregoing configuration of the present invention, the socket body can be readily assembled to the connector body by shifting it from either the front or rear side of the connector body. In the assembled state, the rear end portion of the socket body is supported by the outer peripheral portion of the support wall, with the pawl walls being fitted into the corresponding elongate engage holes provided in the large-diameter chamber section of the connector body.

BRIEF DESCRIPTION OF THE DRAWINGS

FIG. 4 is a fragmentary perspective view of a connector body shown in FIG. 3;

FIG. 5 is a perspective view of a socket body shown in FIG. 3; and

FIG. 6 is a view, partly in cross section, showing the connected state of a conventional pipe connector.

DETAILED DESCRIPTION OF THE PREFERRED EMBODIMENTS

Figure 1:
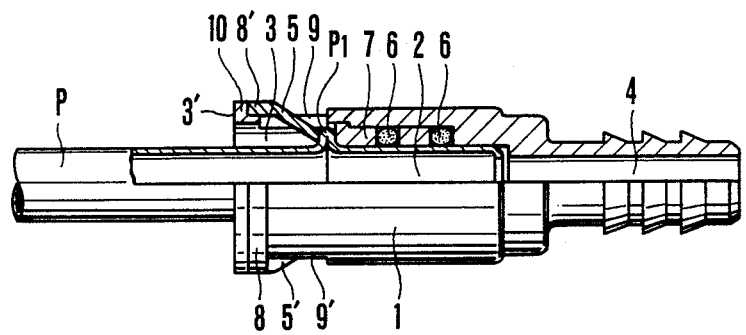
FIG. 1 is a view, partly in cross section, showing the connected state of an embodiment of a small-diameter pipe connector according to the present invention.

In the drawings, equivalent parts or portions are designated by the same reference numeral.

Figure 2:
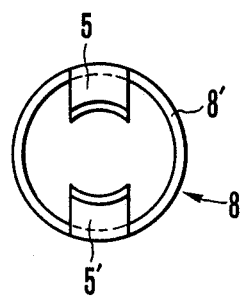
FIG. 2 is a front view of a socket body shown in FIG. 1.

In FIGS. 1 and 2 showing a first embodiment, 1 is a connector body made of metal or resin which has a channel 4, a stepped small-diameter chamber 2, and a stepped large-diameter chamber 3 formed axially thereinside and communicated with each other. A front end portion of the connector body 1 around the channel 4 has a joint wall adapted for connection with a resinous tube or rubber hose (not shown), and a rear peripheral wall portion of the connector body around the large-diameter chamber has a support wall 3' with a collar wall 10 projecting therefrom. 6 is a seal ring member made of elastic material such as rubber. As illustrated, there are provided a plurality of such seal ring members in the small-diameter chamber 2 as desired with spacers interposed therebetween, and a short cylindrical bush 7 for holding the seal ring members on the rear side thereof is provided with has a collar wall abutting on a stepped portion of the large-diameter chamber 3. 8 is a socket body made of metallic spring material or resin whose rear end peripheral wall portion 8' has an inner diameter slightly larger than the outer diameter of the connector body 1. The socket body 8 has obliquely-projecting pawl walls 5 and 5' oppositely formed on the front side thereof, these pawl walls are adapted to fit into elongate engage holes 9 and 9' formed in the peripheral wall of the connector body 1 around the large-diameter chamber 3, and when assembled, the rear end peripheral wall portion 8' of the socket body is seated on the outer peripheral surface of the rear peripheral wall portion of the support wall 3' so that the socket body 8 is supported by the collar wall 10. Here, the outer diameter of the receiving portion of the support wall 3' for support of the socket body 8 and the outer diameter of the outer peripheral surface of the connector body 1 are made substantially equal to the inner diameter of the rear end peripheral wall portion 8' of the socket body 8. P is a pipe whose expanded annular wall portion $P_1$ in the vicinity of its distal end, in the connected state, is resiliently locked by the distal ends of the pawl walls 5 and 5' in the large-diameter chamber 3.

Figure 3:
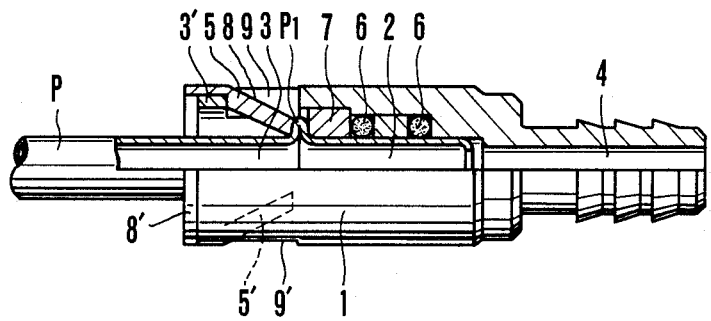
FIG. 3 is a view, partly in cross section, showing the connected state of another embodiment of the small-diameter pipe connector according to the present invention.

A second embodiment shown in FIGS. 3 through 5 is identical with the first embodiment shown in FIGS. 1 and 2 except that the support wall 3' has grooves 11 and 11' and the pawl walls 5 and 5' have stepped notches 12 and 12'.

Specifically, in the second embodiment, the connector body 1 has the grooves 11 and 11' oppositely formed in the outer peripheral surface thereof. On the other hand, the socket body 8 has the stepped notches 12 and 12' formed in the respective root portions of the pawl walls 5 and 5'. Similarly to the first embodiment shown in FIGS. 1 and 2, when connecting the connector to the pipe P such that the expanded annular wall portion $P_1$ in the vicinity of the distal end of the pipe be resiliently locked by the distal ends of the pawl walls 5 and 5', the pawls walls 5 and 5' are fitted into the elongate engage holes 9 and 9' in embedded form, and the stepped notches 12 and 12' are made to engage with the corresponding bottoms of the grooves 11 and 11' of the connector body 1 such that the socket body 8 seats on the outer peripheral surface of the support wall 3' from rear.

As described above, the small-diameter pipe connector according to the present invention is configured so that the rear end peripheral wall portion 8' of the socket body 8 is seated on the rear peripheral wall portion of the large-diameter chamber 3 of the connector body 1 from outside and the socket body 8 is supported by the collar wall 10, or alternatively that the stepped notches 12 and 12' of the socket body 8 are engaged with the corresponding bottoms of the grooves 11 and 11' of the connector body 1 and the pawl walls 5 and 5' are fitted into the elongate engage holes 9 and 9' in embedded form. Therefore, the inner diameter of the support wall 3' can be decreased at least by a size corresponding to the thickness of the rear end peripheral wall portion 8' of the socket body 8 in consideration of the amount of snapping of the pawl walls 5 and 5', the whole connector inclusive of the connector body 1 can be made radially compact correspondingly, the socket body 8 can be assembled to the peripheral surface of the support wall 3' only by shifting it axially from either the front or rear side of the connector body 1, this makes it easy to attach and assemble the connector even in a narrow space without interference and malfunction, the pawl walls 5 and 5' can be made comparatively short because the socket body 8 can be made small in diameter, this makes sure the resilient locking of the expanded annular wall portion $P_1$ of the pipe P and lightens the degree of fatigue in the pawl walls, and thus, the small-diameter pipe connector can maintain the reliable connected state with the pipe very effectively over a long period of time.

What is claimed is:

1. A connector for connecting a small-diameter pipe, said pipe having opposed first and second ends and an expanded annular wall portion spaced from the first end, said connector comprising:
    a connector body having opposed front and rear ends, a channel extending axially into the body from the front end, a small-diameter chamber disposed rearwardly of and in communication with the channel and being provided with a seal ring and a bush therein, said seal ring and said bush being generally annular and having central openings dimensioned to receive the first end of the pipe and to prevent passage of the expanded annular wall portion of the pipe therethrough, a large-diameter chamber disposed rearwardly of and in communication with the small-diameter chamber, the large-diameter chamber being dimensioned to receive the expanded annular wall portion of the pipe therein, the rear end of the body defining a continuous annular support wall having an outer peripheral surface, a plurality of axially-elongate holes disposed forwardly of the continuous annular support wall of the body and extending into the large-diameter chamber; and
    a socket body having an annular rear end wall and a plurality of obliquely-projecting pawl walls extending forwardly from the rear end wall of the socket body and inwardly through the axially-elongate holes in the connector body and into the large-diameter chamber, said socket body including an inner peripheral surface, at least a portion of the inner peripheral surface of the socket body engaging at least a portion of the outer peripheral surface of the connector body, wherein the pawl walls of the socket member resiliently lock the pipe in the connector body.

2. A connector according to claim 1, wherein the body is further defined by a collar wall projecting outward from the outer peripheral surface of the support wall of the connector body, the rear end wall of the socket body being engaged with the collar wall.

3. A connector according to claim 1, wherein the support wall is defined by grooves formed in alignment with the axially elongate holes and stepped notches being formed in root portions of the pawl walls of the socket body which are configured to engage with the grooves.

4. A connector according to claim 3, wherein the rear peripheral wall of the socket body is substantially identical in outer diameter with the connector body.

5. A connector according to claim 1, wherein the pipe is made of a metallic pipe or resinous tube.

6. A connector according to claim 1 wherein to maximum outer diameter defined by the respective connector body and the socket body are substantially equal.

7. A connector for connecting a small-diameter pipe, said pipe having opposed first and second ends and an expanded annular wall portion spaced from the first end, said connector comprising:
 a connector body having opposed front and rear ends, a channel extending axially into the connector body from the front end, a large diameter chamber disposed rearwardly of and in communication with the channel, the chamber being dimensioned to receive the expanded annular wall portion of the pipe therein, the connector body including a plurality of axially-elongate holes spaced from the rear end of the connector body and extending into the large-diameter chamber thereof, a continuous annular support wall having an outer peripheral surface disposed intermediate the axially-elongate holes in the connector body and the rear end of the body, the rear end of the body being defined by a continuous collar wall projecting outwardly from the outer peripheral surfaces of the support wall bf the connector body; and
 a socket body having an annular rear end wall with a rear axial end and an inner peripheral surface, said annular rear wall being engaged over the connector body such that the inner peripheral surface thereof is engaged over the outer peripheral surface of the support wall of the connector body and such that the rear axial end wall of the socket body is engaged against a forwardly facing surface of the collar wall, the socket body further comprising a plurality of obliquely-projecting pawl walls extending forwardly from the rear end wall of the socket body and inwardly through the axially-elongate holes in the connector body for snap fit engaging the expanded annular wall and retaining the pipe in the connector body.

8. A connector as in claim 6 wherein the collar wall of the connector body and the annular rear end wall of the socket body define outer diameters that are substantially equal.

9. A connector for connecting a small-diameter pipe, said pipe having opposed first and second ends and an expanded annular wall portion spaced from the first end, said connector comprising:
 a connector body having opposed front and rear ends, a channel extending axially into the connector body from the front end, a large diameter chamber disposed rearwardly of and in communication with the channel, the chamber being dimensioned to receive the expanded annular wall portion of the pipe therein, the rear end of the body defining a continuous annular support wall having a rearwardly facing annular surface and an outer peripheral surface, the outer peripheral surface of the support wall being characterized by a plurality of spaced apart axially extending grooves formed therein, a plurality of axially-elongate holes disposed forwardly of the continuous annular support wall of the body and in alignment with the respective grooves of the support wall, the axially-elongate holes extending into the large-diameter chamber of the connector body; and
 a socket body having an annular rear end wall with a forwardly facing surface in abutting relationship with the rearwardly facing surface of the support wall of the connector body, the socket body further comprising a plurality of pawl walls aligned respectively with the grooves in the support wall of the connector body, each said pawl wall including a notch resiliently engaged with one said respective groove of the support wall and said pawl walls portion extending obliquely through the axially-elongate holes in the connector body and into the chamber for engaging of the expanded annular wall of the pipe and retaining the pipe in the connector body.

10. A connector according to claim 8 wherein the annular rear wall of the socket body defines a outer maximum diameter substantially equal to the outer maximum diameter of the support wall of the connector body.

11. A connector as in claim 9 wherein portions of the pawl walls engaged in the grooves of the connector body define a continuous outer circumference with portions of the support wall intermediate the grooves.

* * * * *